April 16, 1929.  J. F. LAWSON  1,709,587
ELECTRIC TUBE WELDING MACHINE
Filed Jan. 13, 1922   3 Sheets-Sheet 1

INVENTOR
J. F. Lawson.
BY J. Edward Maybee.
ATTY.

April 16, 1929.  J. F. LAWSON  1,709,587
ELECTRIC TUBE WELDING MACHINE
Filed Jan. 13, 1922  3 Sheets-Sheet 2

INVENTOR
J. F. Lawson
BY J. Edward Maybee
ATTY.

April 16, 1929.  J. F. LAWSON  1,709,587
ELECTRIC TUBE WELDING MACHINE
Filed Jan. 13, 1922  3 Sheets-Sheet 3

INVENTOR
J. F. Lawson
BY J. Edward Maybee
ATTY.

Patented Apr. 16, 1929.

1,709,587

UNITED STATES PATENT OFFICE.

JOHN F. LAWSON, OF TORONTO, ONTARIO, CANADA.

ELECTRIC TUBE-WELDING MACHINE.

Application filed January 13, 1922. Serial No. 529,031.

This invention relates to tube welding machines in which the welding is effected by the passage of a heating current between the abutting edges of the tube as the latter is fed through the machine, and my object is to devise a machine of this type which will be rapid and efficient in operation, durable and easily adjusted and operated.

Figure 1:
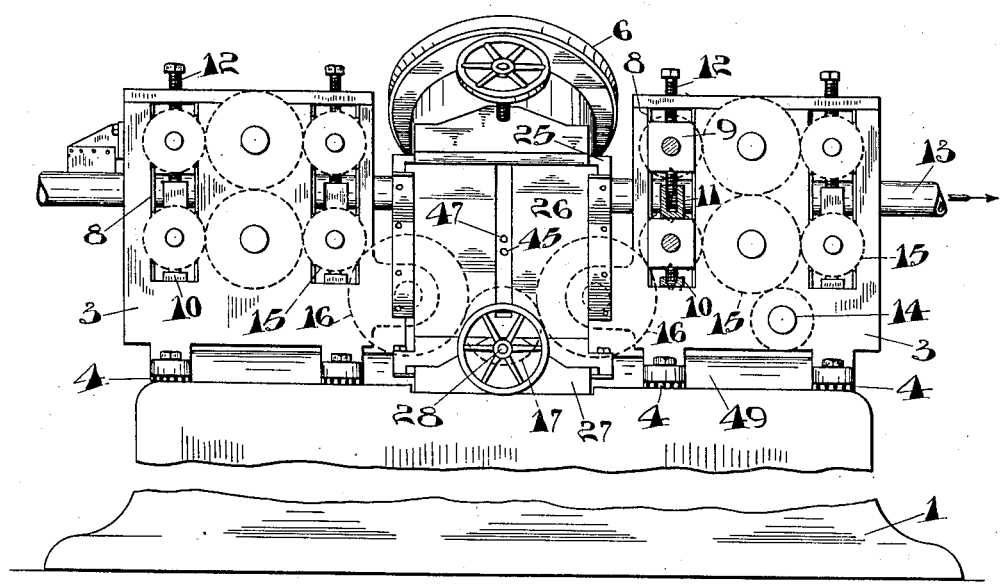
Figure 2:
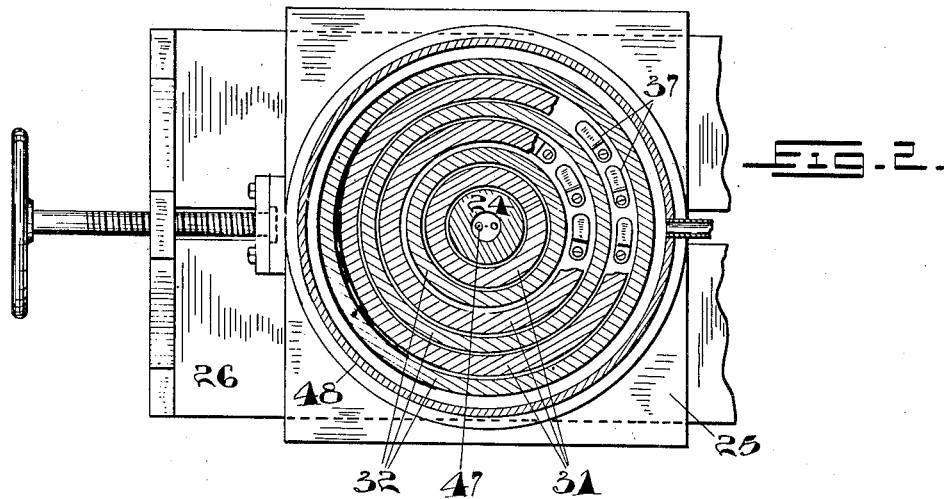
Figure 3:
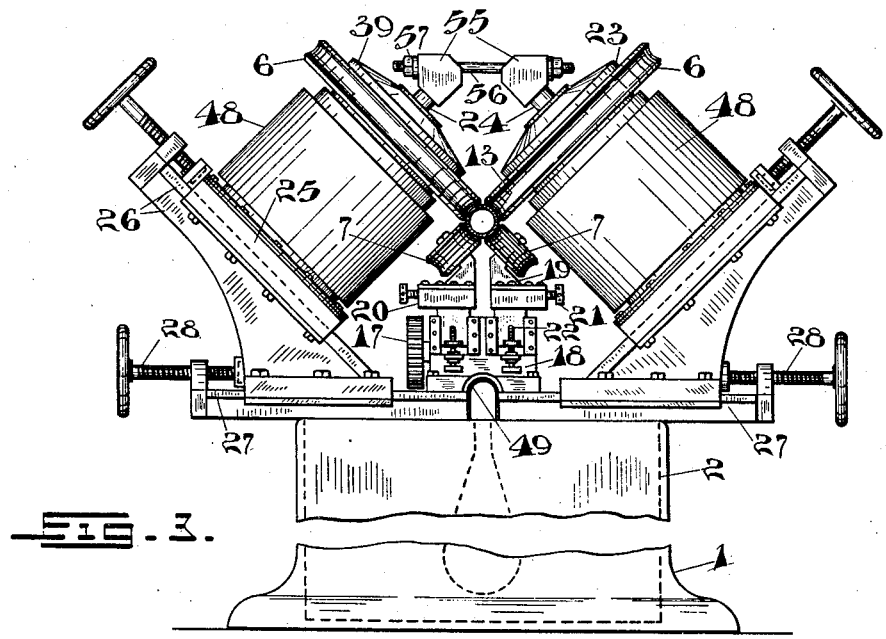
Figure 4:
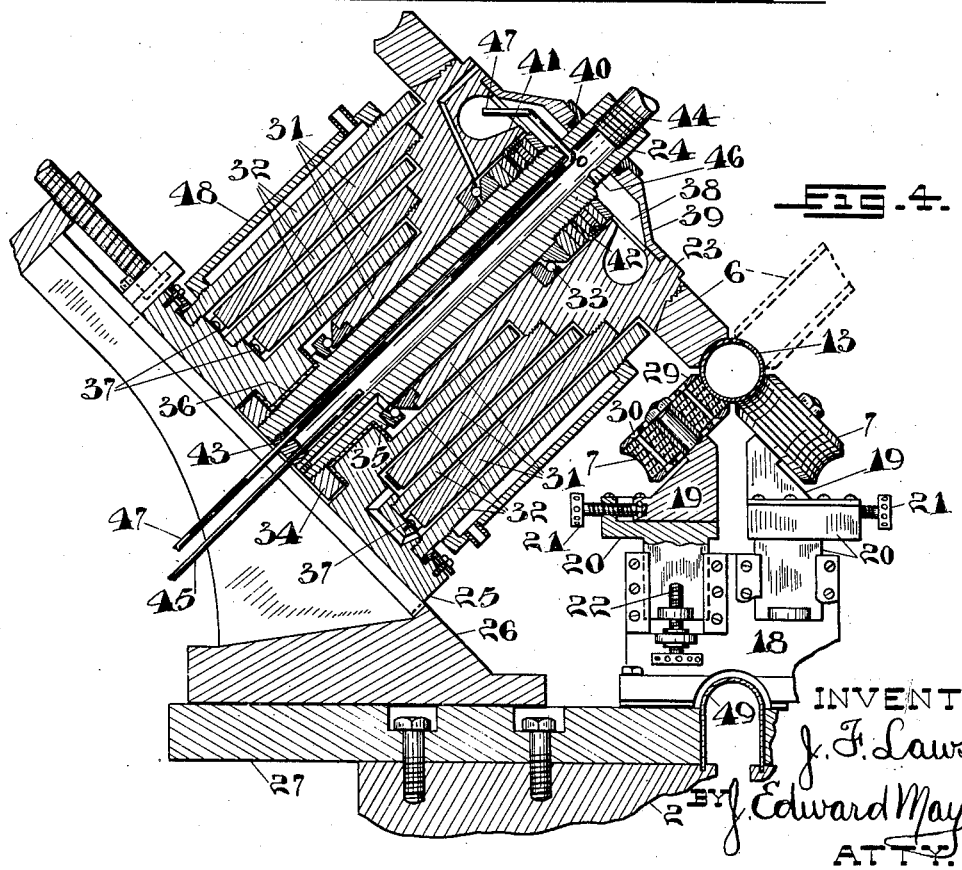
Figures 5, 6, 7:
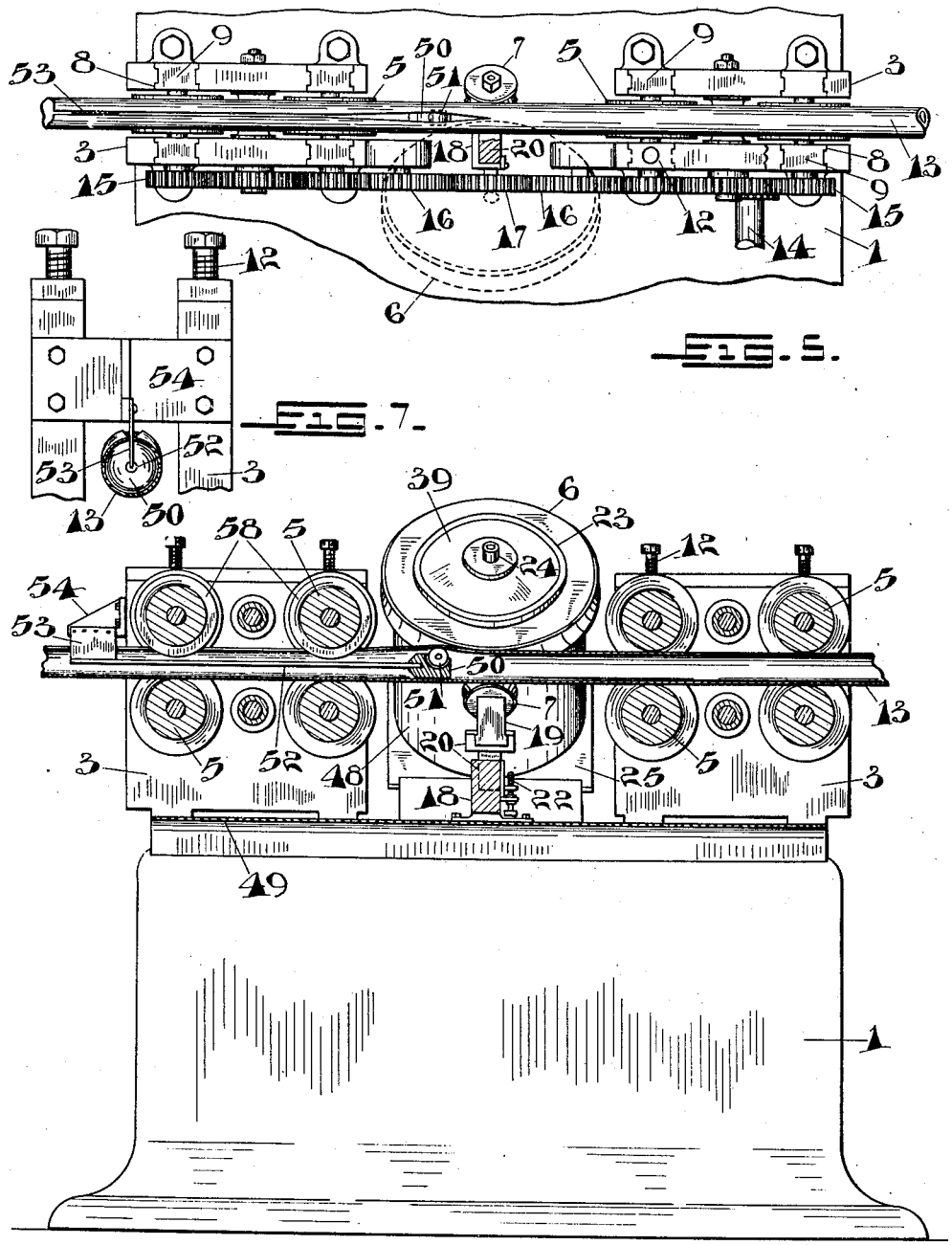

I attain my object by means of the constructions hereinafter described and illustrated in the accompanying drawings in which Fig. 1 is a side elevation of the machine;

Fig. 2 is a cross section through one of the roller electrodes and its support;

Fig. 3 an end elevation of the machine;

Fig. 4 a vertical section on an enlarged scale of part of the machine showing particularly the roller electrodes and supporting rollers and their supporting means;

Fig. 5 a plan view of part of the machine showing the feed rolls and one of the supporting rollers, one of the electrode disks being shown in dotted lines;

Fig. 6 a longitudinal section of the machine, the transformer being shown in side elevation; and Fig. 7 a detail in end elevation showing the seam spreader.

In the drawings like numerals of reference indicate corresponding parts in the different figures.

1 is a transformer casing which, as is common in the art, forms the base of the machine. This transformer, being of an ordinary type, is not shown in detail. Suffice it to say that 2 are plates which form the ends of the secondary circuit of the transformer.

On these plates the frames supporting the feed rollers, and the supporting roller supports are carried, being separated, however, from said plates by suitable insulation.

Referring particularly to Figs. 1, 5 and 6 of the drawings, it will be seen that separate frames 3 are provided for the feed rollers 5 at the opposite end of the apparatus, these frames being independently connected to the plates 2 and separated therefrom by insulation 4.

The frames 3 are provided with vertical slots 8 forming guides for the boxes 9 in which the feed rollers are journalled. These boxes are positively adjustable as to their vertical position and their spacing by the following means. A telescopic screw 10 is located between each lower box and the bottom of the slot, a telescopic screw 11 between each lower box and the box above it, and an adjusting screw 12 is screwed through the frame to engage the upper side of each upper box. By suitably operating the screws, the exact position of each pair of rollers relative to the tube 13 and relative to one another may be accurately adjusted.

The rollers are driven from the shaft 14 located adjacent one end of the machine. This shaft actuates the adjacent feed rollers 5 by means of a train of gears 15 as will be readily understood particularly on reference to Fig. 1. The feed rollers at the opposite end of the machine are driven from the feed rolls adjacent the drive shaft by the following means. Gear wheels 16 are journalled on the frames 3 meshing with the driving gear wheels of the adjacent lower feed rolls. All the gears described may be of a magnetic metal, but the driving connection between the gears 16 is formed by a gear 17 of non-magnetic metal which is journalled on the supporting frame 18 of the support rollers 7. This is important, as owing to the location of the roller electrodes 6 and supporting rollers 7 in the central position shown, it is important that there shall be no complete magnetic circuit formed by the frames and feed rollers. This supporting frame 18 is formed of a non-magnetic metal.

The supporting rollers are carried on supports 19 which are horizontally adjustable on the upper ends of slides 20 by means of adjusting screws 21. The slides 20 are themselves adjustable on the frame 18 by means of the adjusting screws 22.

The journals on which the supporting rollers rotate are set at an angle of 45° to the horizontal, and when in operation the rollers are substantially radial to the axis of the tube 13.

The roller electrodes 6 are formed as disks, each connected to a hub 23, which hub is journalled on a spindle 24 carried by a support 25 which is slidable on a guide 26 inclined at an angle of 45° to the horizontal, this guide itself being on the horizontal guides 27 adjustable to and from the tube by means of adjusting screws 28. Normally the roller electrodes are radially positioned relative to the axis of the tube. The seam of the tube is uppermost between the adjacent edges of the electrodes. It will be noted that the electrodes and supporting rollers are grooved so as to contact with practically the whole of the circumference of the tube at the welding point. It will also be noted that the axes of the electrodes are at right angles to one another and that the tube supporting rollers are each diametrically opposite one of the electrodes. Perfect support is thus given the tube and the edges of the seam are readily brought into proper contact with one another at the welding point. It is also found that there is a minimum of wear on both the electrodes and the supporting rollers as rubbing friction is to a considerable extent eliminated and any wear on the rollers and electrodes is substantially symmetrically distributed.

The supporting rollers are preferably formed of a plurality of disks of fibre board clamped between brass disks 29 secured together by bolts or rivets 30.

The preferred construction of the roller electrodes, their supports and electrical contact means is substantially as follows. The hub 23 of each electrode is formed with a plurality of sleeves 31, while the support 25 is formed with a plurality of sleeves 32 forming annular spaces into which the the sleeves 31 project. It will be understood, of course, that the sleeves may be either separate parts as shown or integrally formed with the parts from which they extend. The inner sleeve is journalled on the spindle 24 by means of ball bearings 33 of ordinary type. The spindle 24 is hollow for a purpose which will hereinafter appear and is secured to the support 25 by means of a nut 34 screwed on the end of the spindle so as to draw a shoulder 35 formed on or secured to the spindle in engagement with an opposed shoulder formed on the support. This spindle is carefully insulated from the support by means of the insulation 36 so that none of the current will flow through the spindle nor the bearings 33.

The guide 27 being in electrical connection with the plates 2, current from the transformer may flow through the guides 27 and 26 and support 25. Between the support 25 and the inner ends of the sleeves 31 are located contacting fingers or brushes 37. These are preferably secured to the support, and a large number of them are employed to prevent overheating. As however there are many objections to rubbing contacts for welding machine electrodes, I prefer to employ a conducting liquid, such as mercury, to secure the necessary electrical connection between the stationary parts and the rotating electrode structures; the spaces between the nesting sleeves contain mercury. I thus secure a large area of contact, which is of great importance in view of the heavy current employed. This contact is practically frictionless, so that the resistance to the turning of the electrodes is very small, which tends to eliminate slip of the electrodes on the tube being welded. With some conducting liquids at least, it is preferable that at least a part of the rotating structure be submerged in the conducting liquid constantly, that is to say, never leave the liquid as the electrode turns, for some conducting liquids, mercury for example, tend to assume a changed character at an exposed surface when no part of the rotating structure remains under the surface constantly, the contact resistance seeming to change also. By keeping the whole rotating structure or some part of it in the liquid at all times, this effect is counteracted and the contact remains good indefinitely.

Owing to the fact that a very high temperature is developed at the welding point, a good deal of heat is conducted by the electrode rollers which would damage the contacts or bearings unless suitable cooling means are provided. To effect the necessary cooling, I form in the hub 23 a water space 38. The outer wall of this water space is formed by a separate cover plate 39 through which the end of the spindle 24 extends. This opening is provided with a packing box 40 of ordinary construction to prevent leakage. The wall of the water space adjacent the spindle is formed by the annular flange 41 which encloses the upper bearings 33 and the adjusting nuts therefor. A packing box 42 of any suitable form is provided between the spindle and the inner surface of the upper end of this flange 41. The lower end of the hollow spindle is closed by the plug 43 and the upper end by a plug 44. Through the lower plug extends the water inlet pipe 45 and an opening 46 is formed in the hollow spindle communicating with the water space 38. A water outlet pipe 47 extends through the plug 43, up through the hollow spindle and through its upper end to a point adjacent the upper side of the water space. The water inlet pipe will be connected with a suitable supply of water, while the outlet pipe will be connected with a suction pump. Water is thus drawn through the water inlet, passes up through the hollow spindle and into the water space. It is heated therein and is withdrawn at the highest point to which it is desired the water should rise. By this system I avoid pressure in the cooling system, which would tend to force water through the packing devices hereinbefore described, and by placing the entrance to the outlet pipe at the highest point to which it is desired the water should rise, I assure the water space being filled to the desired extent.

I have found that heat tends to travel from the disk of the electrode directly to the outer sleeve 32 unduly heating the mercury and causing it to expand and overheat. I therefore apply to the outer sleeve 32 a water jacket 48 through which water is forced or drawn in any suitable manner. I find that the combination of this water jacket with the water space in the hub of the electrode will keep the parts sufficiently cool.

As the supports 25 are vertically adjustable on the guides 26, slots must be provided in the guides for the passage of the water outlet and inlet pipes 47 and 45.

As bits of scale or other particles are apt to drop from the tube which might fall into the transformer, through the division between the terminal plates 2, I provide an arch-shaped cover of fibre 49 which extends over the opening between the plates from end to end of the machine.

An important feature of my device is the means provided for ensuring that the edges of the seam shall accurately abut at the point of welding and for providing for the "take-up", that is the slight decrease in the circumference of the tube which takes place at the point of welding. It is evident that if the edges of the same abut immediately in front of the welding point this take-up cannot take place and a weak joint results. If the edges overlap under the pressure of the electrodes and the supporting rollers, the take-up is provided for, but in this case, a clumsy-looking joint results. To secure a solid, neat joint therefore I lift, and thus spread, the edges of the seam at a point between the feed rollers and the electrodes and close to the latter and the extent of this lift is just sufficient to permit of the take up at the point of fusion without interference, the edges of the seam just coming together where they are softened by the heat sufficient to permit of the take-up.

It is evident that the spreader cannot be located in front of the feed rolls, as the edges of the seam would immediately after spreading be closed again and without any certainty that they would be accurately alined, and also that to ensure accurate alinement, as well as spacing of the edges, the spreader must act from within the tube and spread by lifting as described. For the purpose described I provide what I term a seam spreader. This seam spreader comprises a head 50, which is adapted to substantially fill the tube when the edges of the seam are substantially abutting. In this head is journalled a roller 51, preferably having its periphery crowned, as shown, to substantially the same curvature as the inside of the tube. This roller projects above the head sufficiently far to bring pressure to bear on the inside of the edges of the tube adjacent the seam to lift and spread the latter as shown particularly in Figs. 5 and 6 of the drawings. This spreader is supported just in front of the point of welding by means of a rod 52 extending axially of the tube and connected to a thin plate 53 connected to a bracket 54 secured to the adjacent frame 3. This plate 53 is sufficiently thin so as not to materially spread the edges of the tube at the joint. The spreader, owing to its location close to the electrode rollers and the supporting rollers lifts the edges from the inside close to the point of welding and spreads them as herein before referred to. Welding occurs almost instantly as they are brought into alinement and into contact and a perfect joint results.

It should be mentioned, of course, that the electrode rollers and their connections are preferably formed of metal of high electrical conductivity.

Additional strength and stiffness is given by connecting the ends of the spindles 24 of the electrode rollers so that the one braces the other. This is effected by securing a member 55 to the upper end of each spindle through which member passes a horizontal rod 56 on the ends of which are threaded the nuts 57.

When the position of the electrodes is being adjusted, one or both of these nuts may be loosened up and after they are adjusted, they are again tightened up to resist pressure radially outward from the tube against the electrodes.

The plate 53 is not sufficient to maintain the seam in an exact central position relative to the electrodes and, as this is of the utmost importance, I provide one or more of the feed rollers in front of the electrodes with annular fins 58 which enter the seam and aline the tube.

What I claim as my invention is:—

1. In an electric tube welding machine, the combination of two grooved roller electrodes set with their axes at right angles to one another; and two grooved tube-supporting rollers, each set diametrically opposite one of the electrodes, the axes of all the rollers lying in substantially the same plane and their grooves being proportioned to approximately embrace the tube.

2. In an electric tube welding machine, the combination of roller electrodes and means substantially opposite the electrodes to support the tube; and a seam spreader in front of and adjacent the rollers, said spreader being adapted to open the seam by increasing the diameter of the tube in line with the seam.

3. In an electric tube welding machine, the combination of roller electrodes and means substantially opposite the electrodes to support the tube; and a seam spreader in front of and adjacent the rollers, said spreader being adapted to open the seam by increasing the diameter of the tube in line with the seam, and said rollers and tube supporting means being adapted to substantially prevent spreading of the tube on a diameter at right angles to the diameter aforesaid.

4. In an electric tube welding machine, the combination of feed rollers; roller electrodes and opposed tube supporting means; and a seam spreader between the feed rollers and the electrodes and close in front of the latter.

5. In an electric tube welding machine, the combination of roller electrodes and means substantially opposite the electrodes to support the tube; and a seam spreader supported from the frame of the machine and extending within the tube to a point in front of and adjacent the rollers adapted to operate against the inside surfaces of the edges of a tube blank.

6. In an electric tube welding machine, the combination of roller electrodes and means substantially opposite the electrodes to support the tube; and a seam spreader in front of and adjacent the rollers, said spreader comprising a head supported in and substantially filling the tube, and a roller journalled in said head engaging the interior of the tube at each side of the seam.

7. In an electric tube welding machine, the combination of roller electrodes and means substantially opposite the electrodes to support the tube; a seam spreader in front of and adjacent the rollers, said spreader comprising an arm supported from the frame of the machine and extending into the tube between its abutting edges, a rod extending longitudinally of the tube, a head connected to the rod and substantially filling the tube, and a roller journalled in said head engaging the interior of the tube at each side of the seam.

8. In an electric tube welding machine, a roller electrode comprising a metal disk adapted to roll on the tube to be welded; a support on which the disk is suitably journalled; a plurality of sleeves on said disk concentric with its journal; and contact members on said support engaging the sleeves.

9. In an electric tube welding machine, a roller electrode comprising a metal disk adapted to roll on the tube to be welded; a support on which the disk is suitably journalled; a plurality of sleeves on said disk concentric with its journal; a plurality of sleeves on the support forming annular spaces into which the sleeves on the disk project; and a conducting liquid contained in said spaces.

10. In an electric tube welding machine; a roller electrode comprising a metal disk adapted to roll on the tube to be welded; a support on which the disk is suitably journalled; a plurality of sleeves on said disk concentric with its journal; a plurality of sleeves on the support forming annular spaces into which the sleeve on the disk project; a conducting liquid contained in said spaces; and contact members on said support engaging the sleeves on the disk.

11. In an electric tube welding machine, a roller electrode comprising a metal disk adapted to roll on the tube to be welded and provided with a hollow hub; a suitably supported hollow journal, on which the disk is rotatably mounted, having an opening communicating with the hollow hub; a water pipe communicating with the interior of the journal; a water pipe extending through the journal into said hollow hub.

12. In an electric tube welding machine, a roller electrode comprising a metal disk adapted to roll on the tube to be welded; a support on which the disk is journalled; an annular chamber, containing a conducting liquid, formed on the support concentric with the journal of the roller; and a part on the electrode extending into the chamber, the liquid forming an electrical connection for the electrode.

13. In an electric tube welding machine, a roller electrode comprising a metal disk adapted to roll on the tube to be welded; a support on which the disk is journalled; and an annular chamber containing a conducting liquid formed between the electrode and its support, the liquid forming an electrical connection for the electrode.

14. In an electric tube welding machine, the combination of a transformer having plates at its upper side forming its secondary circuit terminals; electrodes and tube supports located centrally above said transformer; feed rollers and driving gearing therefor carried by frames secured to and insulated from said secondary circuit terminal plates, said frames and gearing at one side of the electrodes being magnetically separated from the frame and gearing at the other side.

15. In an electric tube welding machine, the combination of a transformer; electrodes and tube supports located centrally above said transformer; feed rollers and driving gearing therefor carried by frames secured to and insulated from said secondary circuit terminal plates, said frames and gearing at one side of the electrode being magnetically separated from the frame and gearing at the other side.

16. In an electric tube welding machine, the combination of two roller electrodes set with their axes at right angles to one another; two tube supporting rollers each set diametrically opposite to one of the electrodes; slides adjustable in a plane parallel to the axis of the tube and at an angle of 45° to the axes of the electrodes; and electrode supports adjustable on the slides in a direction to and from the tube at right angles to the axes of the electrodes.

17. In an electric tube welding machine, the combination of two roller electrodes set with their axes at right angles to one another; two tube supporting rollers each set diametrically opposite to one of the electrodes; slides adjustable in a plane parallel to the axis of the tube and at an angle of 45° to the axes of the electrodes; and supports for the supporting rollers adjustable on the slides in a direction to and from the tube at right angles to the axes of the rollers.

18. In an electric tube welding machine, the combination of two roller electrodes set with their axes at right angles to one another; two tube supporting rollers each set diametrically opposite to one of the electrodes; slides adjustable in a plane parallel to the axis of the tube and at an angle of 45° to the axes of the electrodes; electrode supports adjustable on the slides in a direction to and from the tube at right angles to the axes of the electrodes; and supports for the supporting rollers adjustable on the slides in a direction to and from the tube at right angles to the axes of the rollers.

19. In an electric tube welding machine, the combination of a transformer having plates at its upper side forming its secondary circuit terminals; electrodes and tube supports located centrally above said transformers; feed rollers and driving gearing therefor carried by frames secured to and insulated from said secondary circuit terminal plates, said frame at one side of the electrodes being completely separated from the frame at the other side; and suitably mounted gear wheel of a non-magnetic metal forming a connection between the feed roller gears of the separated frame.

20. In an electric tube welding machine, the combination of two roller electrodes set with their axes at right angles to one another; two tube supporting rollers, each set diametrically opposite one of the electrodes; and an adjustable brace connecting the adjacent ends of the journals of the electrode rollers.

21. In an electric tube welding machine, the combination of a pair of grooved roller electrodes, set at an angle of substantially 90° to each other, the groove of each roller contacting with the tube to be welded throughout an arc of substantially 90°, and tube-supporting means at the opposite side of the tube.

22. In an electric tube welding machine, the combination of a pair of grooved roller electrodes, set at an angle of substantially 90° to each other, the groove of each roller contacting with the tube to be welded from a point near the tube seam to a point substantially 45° away therefrom on the periphery of the tube, means for adjusting said electrodes toward and from the tube axis along radii of the tube which are substantially 90° apart, and means to support the tube against the pressure of said electrodes.

23. In an electric tube welding machine, an electrode structure to rotate by its frictional engagement with the work, a stationary member forming with the said electrode structure a space concentric with the line containing the axis of rotation of said structure, and a conducting liquid in said space forming an electrical connection between said stationary member and the electrode structure through which connection welding current is supplied to the electrode, said conducting liquid constantly submerging at least one part of the rotating electrode structure as the electrode structure rotates.

24. An electric tube welding machine having a rotating electrode structure, bearing means to support said electrode structure, and means to conduct current to said electrode structure comprising a stationary member and a conducting liquid completing an electrical connection between said stationary member and said rotating structure, said conducting liquid constantly submerging at least one part of the rotating electrode structure as the electrode structure rotates.

25. In an electric tube welding machine, a roller electrode-structure including a metal disc, axle means for supporting said electrode-structure, means forming a chamber with said electrode-structure, said chamber surrounding said axle means, and a conducting liquid in said chamber to form the welding-current connection between the electrode structure and the chamber-forming-means.

26. In an electric tube welding machine, two independent roller electrodes on opposite sides of the seam, coacting tube-supporting means, a supporting brace extending between the electrodes, and a supporting bearing for each electrode on the opposite side of the respective electrode from said brace.

27. In an electric tube welding machine, a roller electrode-structure having a chamber for a cooling fluid, passage-way means for admitting a cooling fluid to said chamber, and passageway outlet means leading from the chamber, characterized by the fact that the entrance to said outlet means is located at substantially the highest point in said chamber which the cooling fluid is desired to reach.

28. In an electric tube welding machine, a roller electrode structure having a chamber for a cooling fluid, passage-way means for admitting a cooling fluid to said chamber, and means for causing a flow from said passage-way means and through the chamber by suction.

29. An electric welding machine of the kind indicated, having an electrode structure to rotate as the work passes it, a stationary member forming with said electrode structure a space concentric with the line containing the axis of rotation of said structure, and a conducting liquid in said space forming an electrical connection between said stationary member and the electrode structure through which welding current is supplied to the electrode, characterized by the fact that at least a part of the rotating structure remains submerged in the conducting liquid as the rotating structure rotates.

30. In an electric tube welding machine, the combination of roller electrodes, tube supporting means, and seam spreader means to engage the inner surface of the tube adjacent the seam edges and displace the edges substantially radially of the tube and away from the tube axis.

Signed at Toronto, this 30th day of December, 1921.

JOHN F. LAWSON.